(12) United States Patent
Hoerger (10) Patent No.: US 6,999,268 B2
(45) Date of Patent: Feb. 14, 2006

(54) METHOD AND SYSTEM OF A HEAD FOR A STORAGE MEDIA

(75) Inventor: Carl Robert Hoerger, Bois, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 10/639,335

(22) Filed: Aug. 12, 2003

(65) Prior Publication Data

US 2005/0036227 A1 Feb. 17, 2005

(51) Int. Cl.
*G11B 5/584* (2006.01)

(52) U.S. Cl. .................................. 360/77.12
(58) Field of Classification Search .............. 360/77.12
See application file for complete search history.

(56) References Cited

U.S. PATENT DOCUMENTS

| | | | |
|---|---|---|---|
| 5,289,328 A | 2/1994 | Saliba | |
| 5,371,638 A | 12/1994 | Saliba | |
| 5,392,170 A | 2/1995 | Solhjell | |
| 5,436,780 A | 7/1995 | Nagata et al. | |
| 5,905,613 A | 5/1999 | Biskeborn et al. | |
| 5,982,711 A | 11/1999 | Knowles et al. | |
| 6,088,184 A | 7/2000 | Hu | |
| 6,118,626 A | 9/2000 | Muftu et al. | |
| 6,169,640 B1 | 1/2001 | Fasen | |
| 6,190,753 B1 | 2/2001 | Koseki et al. | |
| 6,222,698 B1 | 4/2001 | Barndt et al. | |
| 6,275,350 B1 * | 8/2001 | Barndt | 360/77.12 |
| 6,456,460 B1 | 9/2002 | Connolly et al. | |
| 2004/0047067 A1 * | 3/2004 | Yip | 360/77.12 |

OTHER PUBLICATIONS

R. Simmons; "Ultrium Technology In-Depth: Closed Loop Servos and MR Heads Deliver High Reliability" Data Storage Article Final Draft, Feb. 1, 2000 (8 p.).

* cited by examiner

*Primary Examiner*—David Hudspeth
*Assistant Examiner*—Mitchell Slavitt (57) ABSTRACT

A method and system of a head for use with a storage media having a first set of read transducers positioned to compensate for shrinkage of the storage media, and a second set of read transducers positioned to compensate for expansion of the storage media.

20 Claims, 7 Drawing Sheets

METHOD AND SYSTEM OF A HEAD FOR A STORAGE MEDIA

BACKGROUND

Magnetic tape storage devices may be used to create backup copies of data stored on computer systems, such as servers. With each new generation of magnetic tape storage devices, the amount of data that may be stored per unit area of the tape may increase. This increase in storage capacity, in some cases, may be achieved by increasing density of tracks on the tape. Tracks are the areas on magnetic tape within which data values may be written. However, as track densities increase, the effects of dimensional changes in the magnetic tape become more pronounced.

Dimensional changes in a magnetic tape may take place for many reasons. Magnetic tapes made from polymer-based substrates, such as polyethylene terephthalate (PET), may change dimension based on environmental factors such as temperature and humidity. Mechanical usage may also change the dimension of the magnetic tape, such as a narrowing of the tape when under tension. Moreover, magnetic tapes tend to shrink in width with age.

When the dimensions of magnetic tape change, it may be difficult to recover information written on the tapes. Tracks containing the information, for example, may not precisely align with the read transducers on the magnetic head of the magnetic tape storage device.

BRIEF SUMMARY

A method and system of a head for use with a storage media having a first set of read transducers positioned to compensate for shrinkage of the storage media, and a second set of read transducers positioned to compensate for expansion of the storage media.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer, magnetic tape and tape drive companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, the discussion of any embodiment is meant only to be exemplary of that embodiment, and not intended to intimate that the scope of the disclosure is limited to that embodiment.

Embodiments of the present invention were developed in the context of writing data to magnetic tape with a magnetic head, possibly in a tape drive system. The applicability, however, of the concepts discussed extends beyond magnetic tape to any magnetic storage media (such as disk drives), and may also extend to non-magnetic storage media, such as optical systems.

Figure 1:
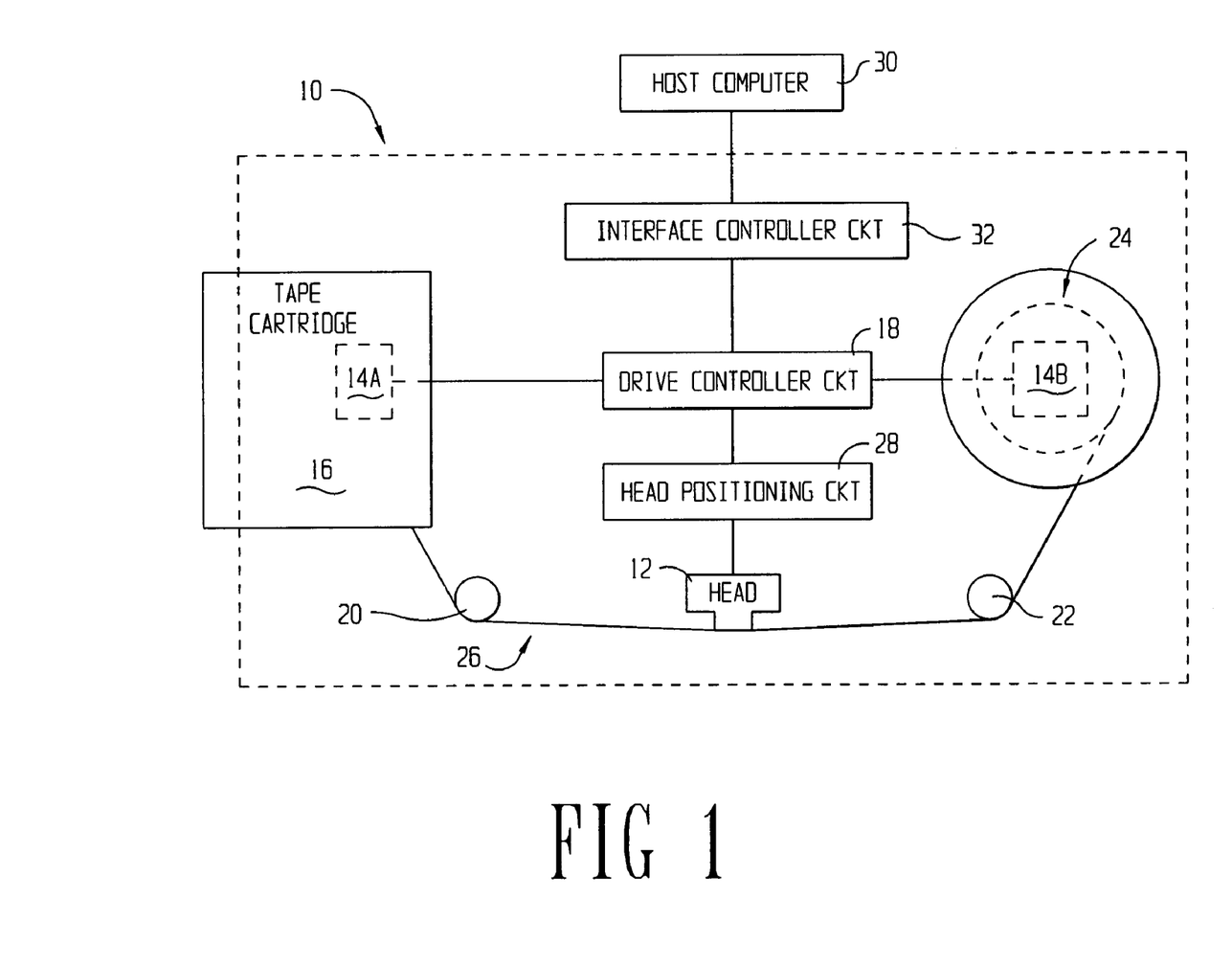
FIG. 1 illustrates a magnetic tape storage device in accordance with embodiments of the invention.

FIG. 1 illustrates a magnetic tape storage device 10 comprising a magnetic head 12 constructed in accordance with embodiments of the invention. The magnetic tape storage device 10 may comprise a drive mechanism 14A which couples to an exemplary tape cartridge 16, and a drive mechanism 14B which couples to a take-up reel 24. The drive mechanism 14 may move the magnetic tape across the head 12 in either a forward or reverse direction at a desired tape speed. The tape drive mechanism 14 may be controlled, at least in part, by a drive controller circuit 18.

The tape cartridge 16 may couple to or within the magnetic tape storage device 10. Once coupled within the device, the tape 26 may be extended across the tape roller 20, magnetic head 12, tape roller 22 and coupled to take-up reel 24.

In order to write data to the magnetic tape 26, the head 12 may be selectively positioned with respect to the width of the tape 26 by head positioning circuit 28. The head positioning circuit 28 may comprise a voice coil motor actuator or a head position stepper motor (neither specifically shown) which performs the positioning operation. The head positioning circuit 28 may likewise be controlled by the drive controller circuit 18. The magnetic tape storage device 10 may couple to a host computer 30 by way of an interface controller circuit 32. The interface controller circuit 32 may be responsible for communicating with the host computer 30 using a suitable communication protocol. The host computer 30 may be a single personal computer, a high-end computer operated as a server, or an array of computers and other electronic equipment coupled together to form a network.

Figure 2:
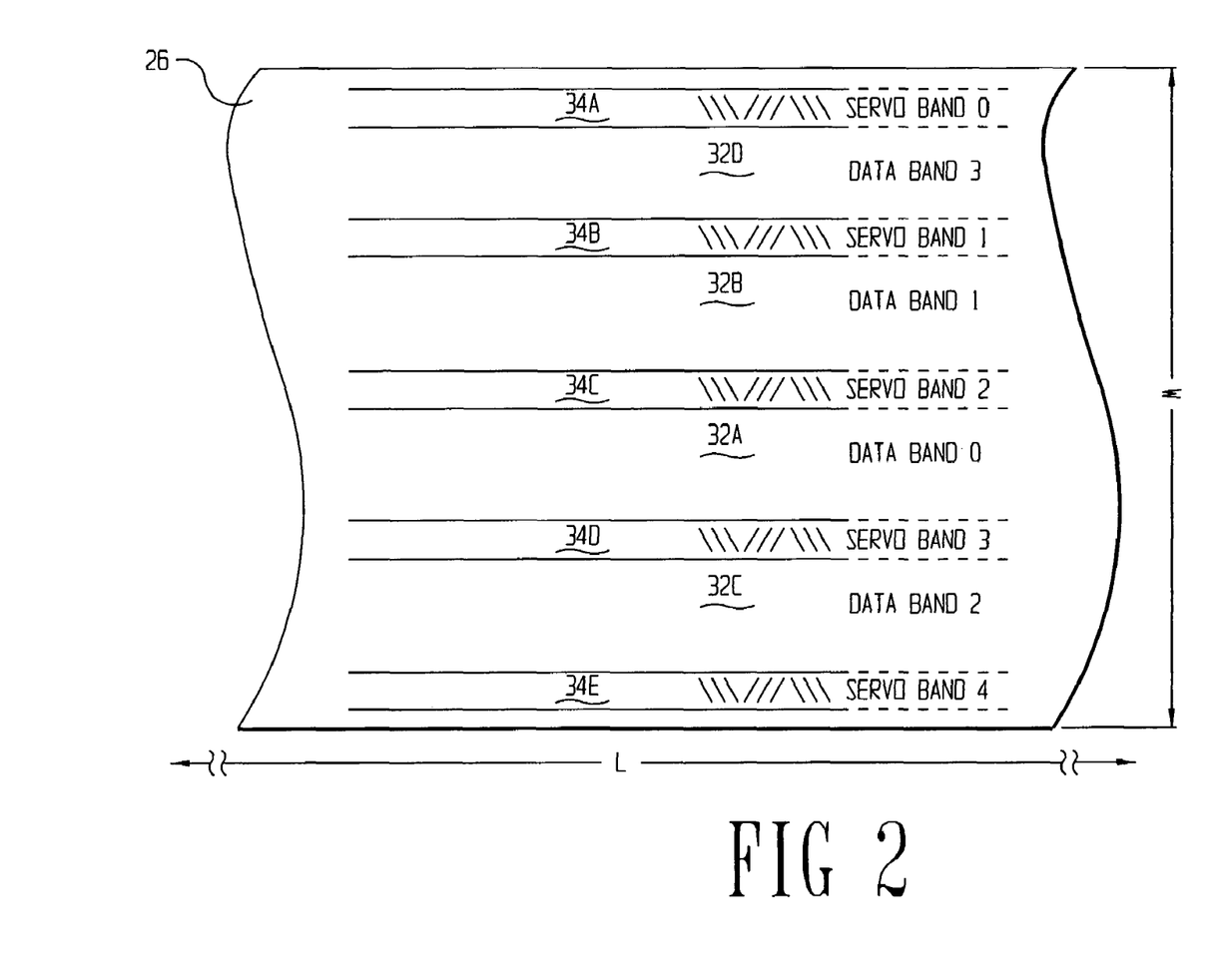
FIG. 2 illustrates servo bands and data bands on a magnetic tape in accordance with embodiments of the invention.

FIG. 2 illustrates a portion of a magnetic tape 26 in accordance with embodiments of the invention. The magnetic tape may have a length L, only a small portion of which may be shown as the tape may be many meters long when placed within a tape cartridge 16 (FIG. 1). Magnetic tape 26 may also have a width W, which may be any suitable size, such as one-half inch. A magnetic tape 26 used in accordance with embodiments of the invention may also comprise four data bands 32 bounded by a plurality of servo bands 34. Each of the data bands 32 may comprise a plurality of data tracks (discussed more fully with respect to FIG. 3) within which data may be written. Thus, not only may magnetic head 12 be positioned over any one (or more) of the data bands 32, but within a data band, the position of the magnetic head 12 may change to align the head over the plurality of tracks. Positioning of the magnetic head within any particular data band may be accomplished by a plurality of servo transducers positioned over the servo bands 34 on each side of the particular data band 32. The servo bands 34 may comprise information which allows the magnetic tape storage device 10 to determine a position of the magnetic head 12 with respect to the width W of the tape.

Figure 3:
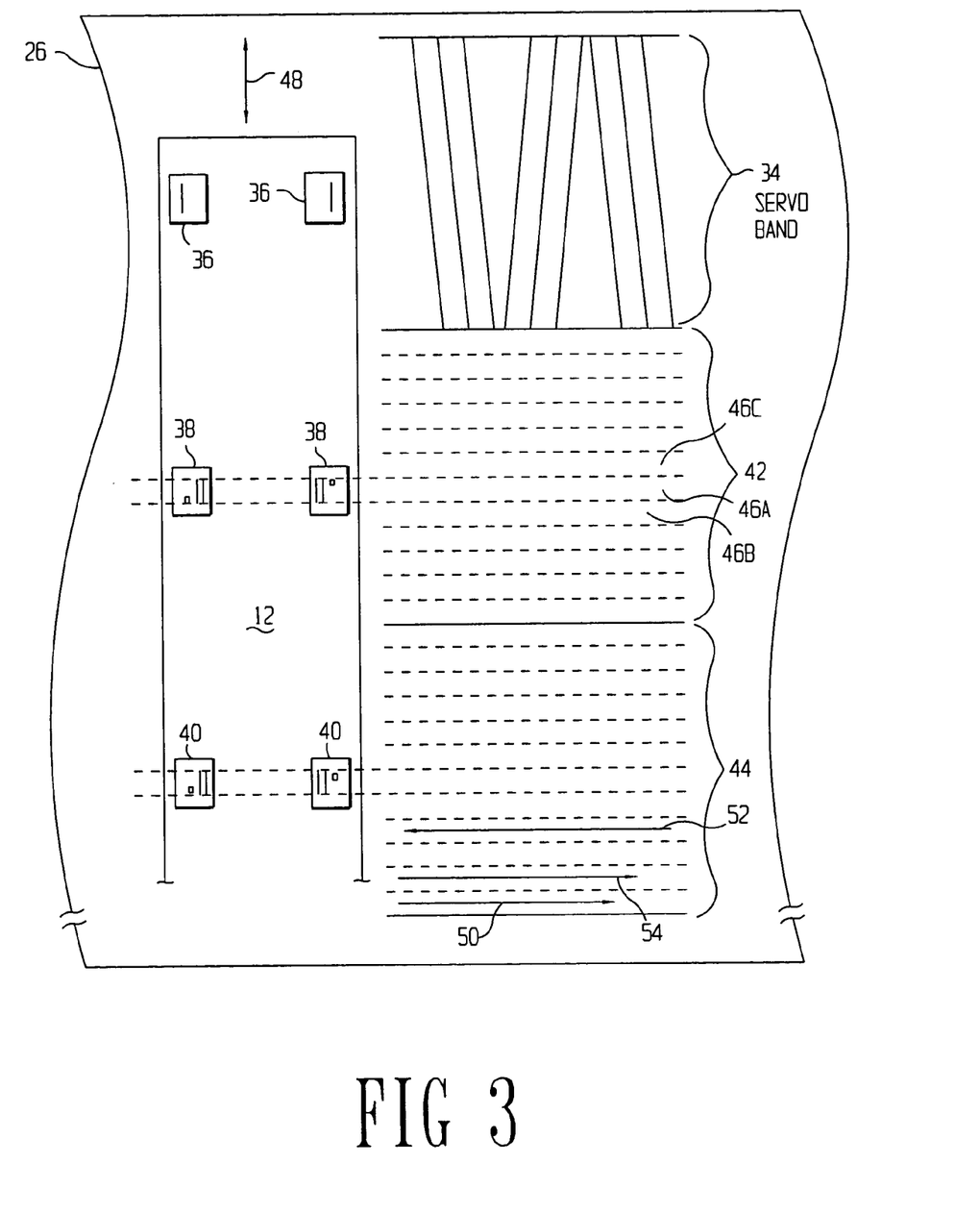
FIG. 3 illustrates a partial magnetic head and a partial magnetic tape in relation to an exemplary servo band and exemplary data tracks in accordance with embodiments of the invention.

FIG. 3 illustrates a portion of the magnetic head 12 constructed in accordance with embodiments of the invention in relation to a portion of the magnetic tape 26. In particular, FIG. 3 illustrates a plurality of servo transducers 36 on a distal end of the magnetic head 12 in relation to the servo band 34. By reading the information coded within the servo band 34 using the servo transducers 36, the lateral position of the magnetic head 12 may be determined and adjusted in order to align the illustrated transducer pairs 38 and 40 over a track within the track bands 42 and 44 respectively. In accordance with embodiments of the invention, each track band 42, 44 may comprise twelve tracks 46 (only a few of which are numbered in FIG. 3). A magnetic head 12 constructed in accordance with the embodiments of the invention may have a long dimension along the width of the magnetic tape and may have eight or more levels of transducer pairs (not all are shown in FIG. 3). Thus, there may be 128 tracks within each data band 32, and therefore 512 data tracks on a magnetic tape 26. Greater or fewer data tracks may be used within each track band 42, 44, and thus the total number of data tracks may likewise change. There may also be a plurality of buffer areas on magnetic tape 26 which are not shown so as not to unduly complicate the drawings.

Referring still to FIG. 3, lateral translation of the magnetic head 12 (illustrated by arrow 48) may align the transducer pairs 38, 40 over any track 46 within the track bands 42, 44 respectively. Positioning of the transducer pairs 38, 40 may be accomplished by a combination of the servo transducers 36 reading information from the servo band 34 in combination with the head positioning circuitry 28 (FIG. 1). Thus, the exemplary transducer pair 38 may be selectively positioned over any of the tracks 46 in the track band 42, such as 46A, 46B and/or 46C. Data may be written to the magnetic tape 26 by each transducer pair 38, 40 (as well as the rest of the transducer pairs not illustrated in FIG. 3) simultaneously in a spiraling-in sequence. For example, and referring to the transducer pair 40 and exemplary track band 44, data may be written in the direction and within the track illustrated by arrow 50. The next set of data may be written in the track in the direction illustrated by arrow 52, followed by writing of data in the track and in the direction illustrated by arrow 54.

Figure 4:
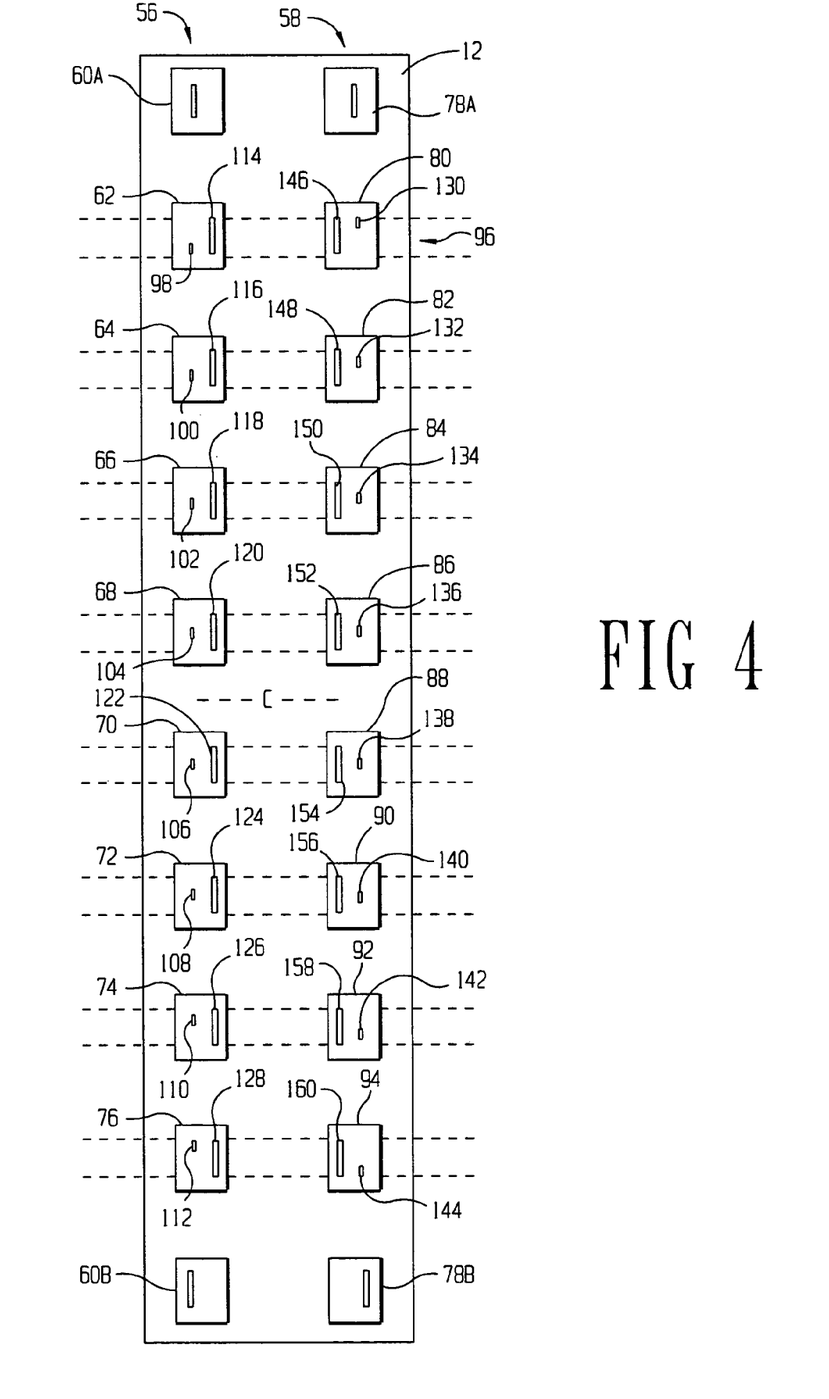
FIG. 4 illustrates a magnetic head aligned with tracks of a magnetic tape in accordance with embodiments of the invention.

FIG. 4 illustrates a magnetic head 12 constructed in accordance with at least some embodiments of the invention. The magnetic head 12 may be referred to as a two "bump" head because it may comprise a first bump 56 and a second bump 58, with each bump possibly having a column of transducer pairs and/or servo transducers. Each column of transducer pairs may be called a "bump" as they may protrude relative to the rest of the head. However, in the following disclosure and in the claims, the term "bump" is not to be construed so as to necessarily require protrusion relative to the rest of the head. Thus, bump 56 may comprise servo transducers 60A, B bounding a plurality of transducer pairs 62, 64, 66, 68, 70, 72, 74 and 76. Likewise, bump 58 may comprise a plurality of servo transducers 78A, B bounding a plurality of transducer pairs 80, 82, 84, 86, 88, 90, 92 and 94. Thus, the magnetic head 12 illustrated in FIG. 4 comprises eight transducer pairs within each bump; however, any number of transducer pairs may be equivalently used, such as sixteen. Transducer pairs at particular elevations (one in each bump) may align over the same track forming aligned pairs. For example, transducer pair 62 and transducer pair 80 may align over the same track 96. During data write operations to track 96, one transducer pair may write data to the data track as the magnetic tape traverses the magnetic head, and the downstream transducer pair may read the information back to ensure correct data placement. FIG. 4 illustrates a situation where each data track, for example track 96, aligns correctly with the magnetic head. In the case of reading data previously written to the magnetic tape aligned as illustrated in FIG. 4, whether just written by a write transducer in a different bump, written at a different time, or written by a different magnetic tape storage device, each of the read elements may be fully capable of reading data from the tape. However, for a variety of reasons the dimensions of the magnetic tape may change, and when these dimensions change the alignment of the tracks in relation to the transducer pairs may likewise change.

In order to compensate for the possibility that alignment of the tracks on a magnetic tape may change because of dimensional instability of the magnetic tape, read transducer position may be progressively biased towards the centerline C of the magnetic head. Tape alignment may change for other reasons, and the transducer positioning may compensate for many types of misalignment, not just misalignment cause by dimensional instability. In particular, in one bump, for example bump 56, the read transducers 98, 100, 102, 104, 106, 108, 110 and 112 may be progressively biased toward the centerline C of the magnetic head 12. The progressive bias may be in addition to any standard offset of the read transducers that may create a different centerline as between the read and write transducers. The standard offset situation is not illustrated in FIG. 4 so as not to unduly complicate the drawings. In accordance with embodiments of the invention, the position of the read transducers within a bump may also be biased away from the centerline C. In exemplary bump 58, the position of read transducers 130, 132, 134, 136, 138, 140, 142 and 144 may be biased away from centerline C. Although the progressive bias toward the centerline is shown to be in the left bump 56 and the bias away from the centerline is shown to be in the right bump 58, the biasing of the read transducers in these bumps may be equivalently reversed.

By having a magnetic head 12 with read transducers in a first bump progressively biased away from the centerline and read transducers in a second bump progressively bias toward the centerline, the magnetic storage device 10 utilizing the magnetic head 12 to read data from a magnetic tape in spite of dimensional changes experienced by the tape. Because dimensional changes may be adequately compensated for during the read process using a magnetic head constructed in accordance with embodiments of the invention, it may be possible to increase the density of the tracks on a magnetic tape beyond that which may be accomplished in situations where the read transducer and write transducer have no bias or a non-progressive bias. For example, for a track-to-track spacing of 14 micro-meters (microns), and taking into of the magnetic tape used by servo bands, it may be possible to have 1800 tracks per inch (width) on the magnetic tape. For the same magnetic head size and transducer pair to transducer pair spacing (within a bump), it may be possible to decrease the track-to-track spacing to 12.6 microns and therefore increase the tracks per inch to 2000 using a magnetic head constructed in accordance with the embodiments of the invention. The gain in tracks per inch may increase somewhat exponentially as the track-to-track spacing decreases (and with corresponding decreases in transducer pair sizes). The gains may be realized because dimensional instability of the magnetic tape is less likely to impair the ability to read the magnetic tape caused by misalignment of the read transducer with the data track.

Figure 5:
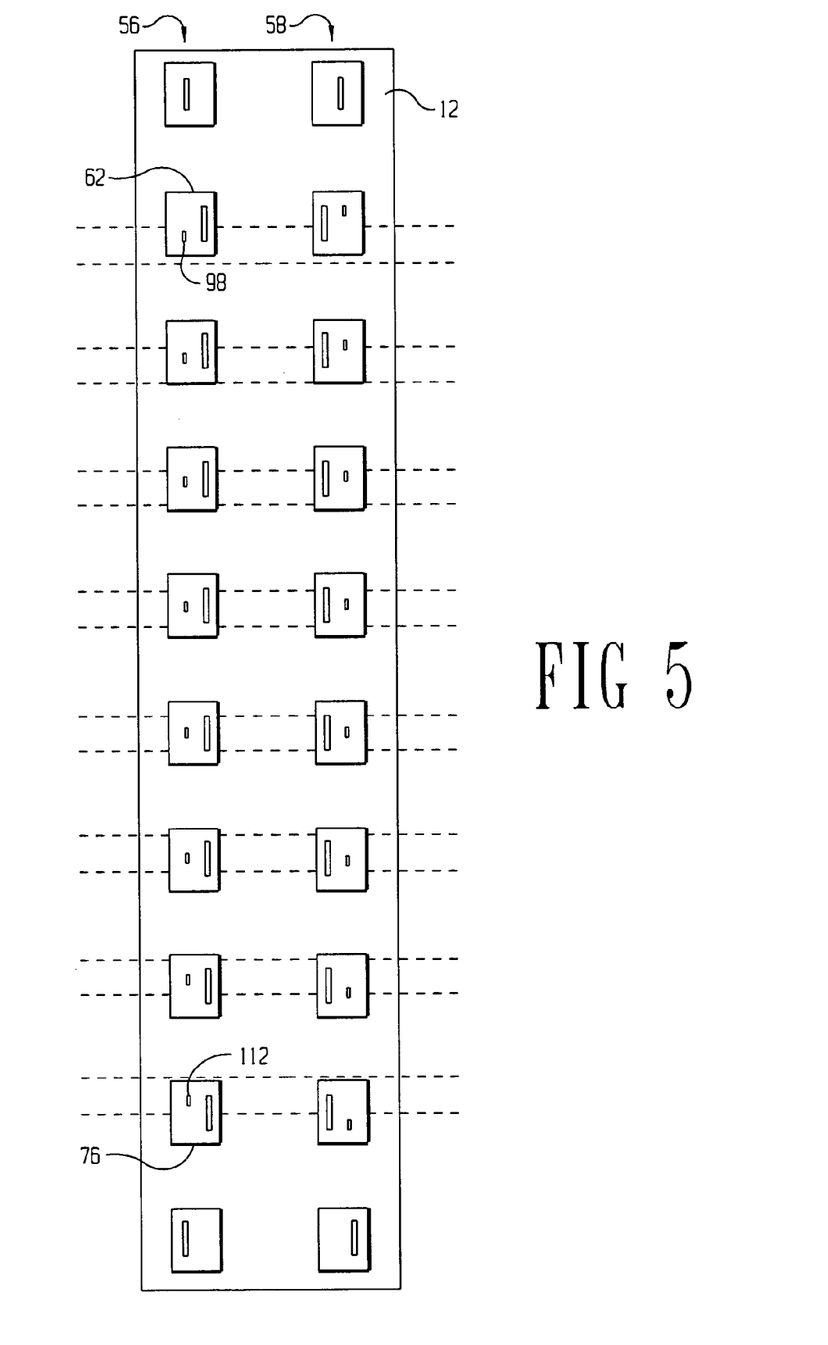
FIG. 5 illustrates a magnetic head in relation to tracks on a magnetic tape where the track-to-track spacing has decreased, in accordance with embodiments of the invention.

FIG. 5 illustrates one exemplary embodiment in which the invention can be used. AS shown in the figure the width of a magnetic tape may have shrunk in relation to the width when the data tracks were written to the magnetic tape. This shrinkage may be caused by age or mechanical tension experienced by the magnetic tape, or other factors not associated with dimensional stability of the tape. Regardless of the reasons, the change in the width may cause the track-to-track spacing to decrease. However, a magnetic head 12 constructed in accordance with embodiments of the invention utilizing read transducers progressively biased toward the centerline may still be able to adequately read the data from the magnetic tape. In particular, bump 56 may illustrate the progressively biasing of the location of the read transducers toward the centerline of the magnetic head 12. Even for the outer transducer pairs 62 and 76, the respective read transducers 98 and 112 may still be sufficiently within the tracks to obtain a signal with a sufficient signal-to-noise ratio to retrieve the data. A magnetic head whose read transducers are not progressively biased toward the centerline may not be able to read the data as in this exemplary case as the read transducer may be near the fringe or out of the track. Only one set of read transducers (within a bump or a magnetic head) may be needed to read data from a magnetic tape, and thus the possibility that the read transducers from the second bump 58 may be outside the track may not affect the reading operation.

Figure 6:
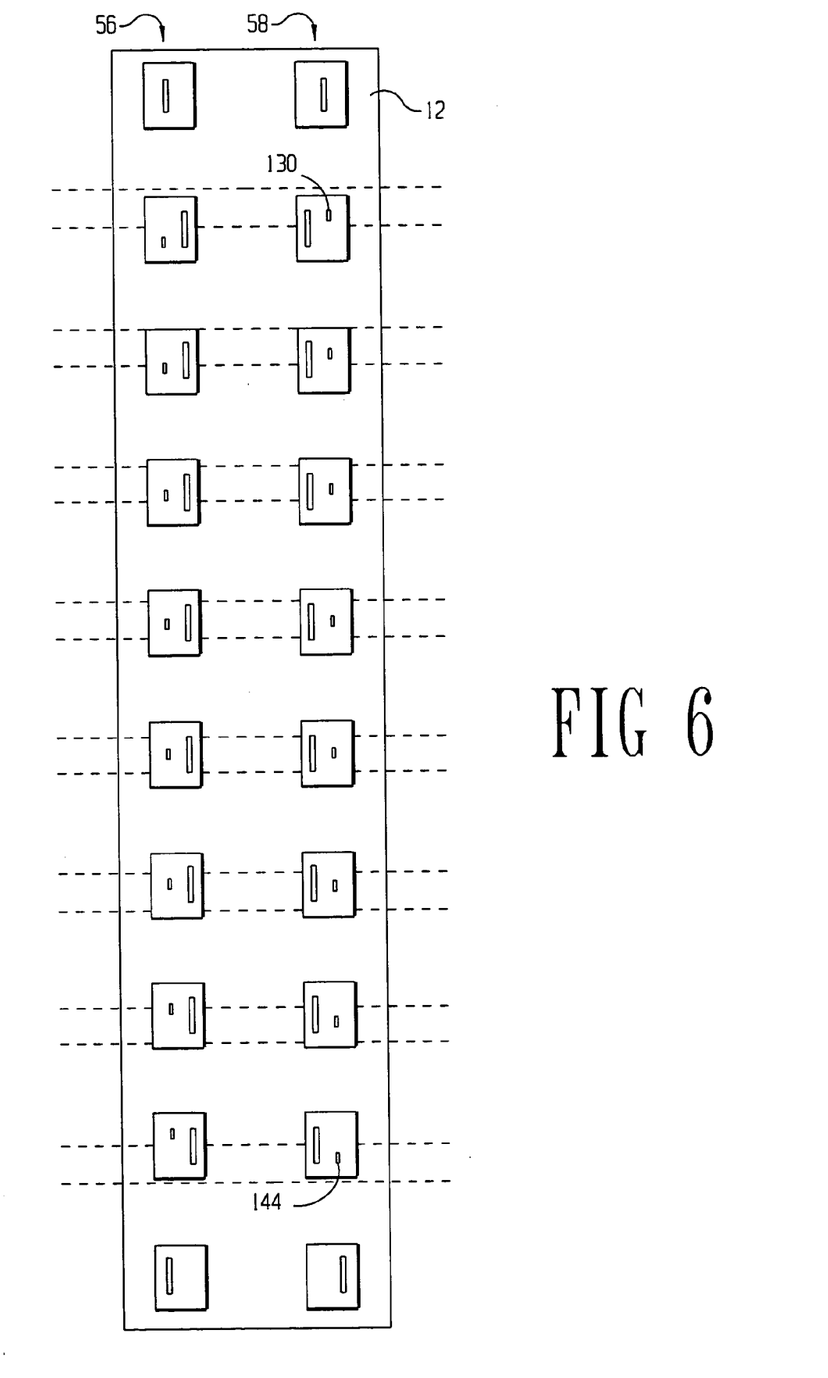
FIG. 6 illustrates a magnetic head in relation to tracks on a magnetic tape where the track-to-track spacing has increased, in accordance with embodiments of the invention.

FIG. 6 illustrates another exemplary embodiment in which the invention can be used. In this embodiment a magnetic tape's width may have increased from the width that it had during writing of the data tracks. Because of the width increase, the track-to-track spacing may have likewise increased. Environmental factors (such as high temperature and humidity) or other factors may cause a magnetic tape's width to increase. A magnetic head 12 constructed in accordance with embodiments of the invention may be able to read the data tracks with a sufficient signal-to-noise ratio to extract the data. Thus, in spite of the exemplary increases in the track-to-track spacing, the read transducers from at least one of the bumps, e.g., bump 58, may be sufficiently within the tracks to read the data. For example, read transducers 130 and 144 may be sufficiently within the outer tracks to read the data. A magnetic head whose read transducers are not progressively biased away from the centerline may not be able to read the data as in this exemplary case as the read transducer may be near the fringe or out of the track. Similar to the discussion with respect to FIG. 5, the possibility that read transducers from a second bump, for example bump 56, may be outside the track may be immaterial inasmuch as only one read transducer per track may be required to retrieve the data.

Although FIGS. 5 and 6 show application of embodiments of the invention in relation to width of magnetic tape, the invention is also applicable to other dimensional alterations, changes and/or inconsistencies in a magnetic tape, or other magnetic storage media.

Figure 7:
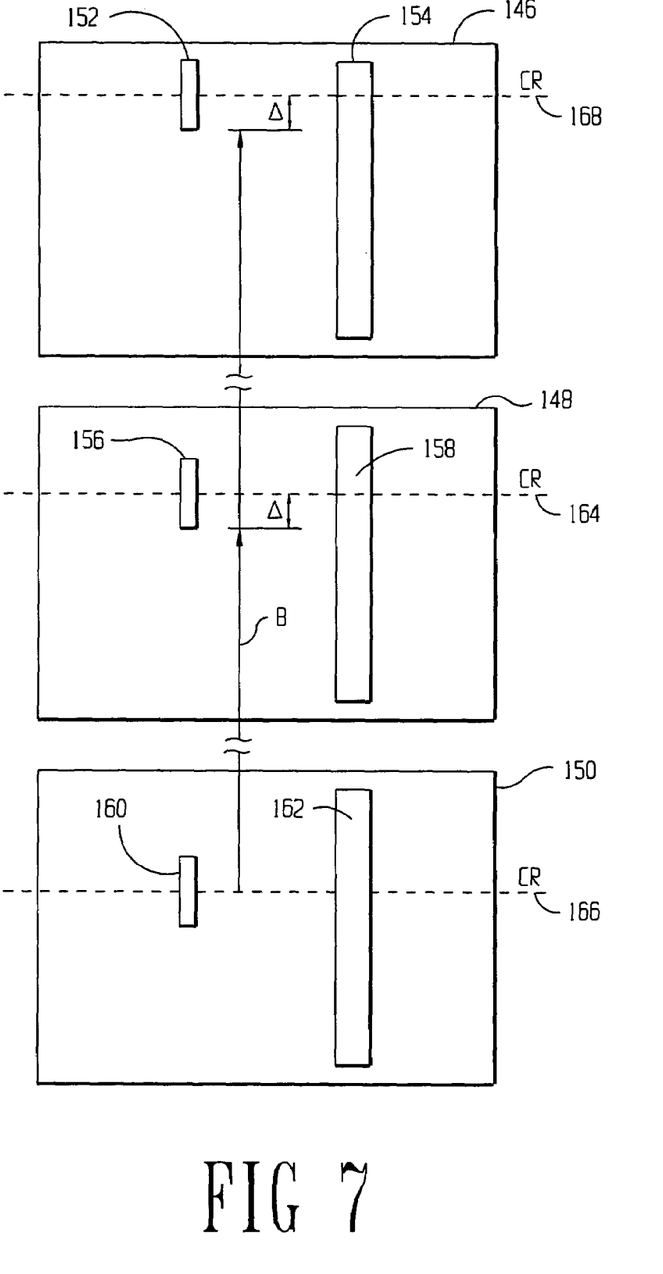
FIG. 7 illustrates a plurality of transducer pairs in accordance with embodiments of the invention.

FIG. 7 illustrates a plurality of transducer pairs 146, 148 and 150 in order to discuss the progressive bias of the read transducers in accordance with embodiments of the invention. The transducer pairs 146, 148 and 150 of FIG. 7 are meant to generically illustrate any of the transducer pairs illustrated in FIGS. 3, 4, 5 and/or 6. Each of the exemplary transducer pairs 146, 148 and 150 may comprise a write transducer and a read transducer. Thus, transducer pair 146 may comprise read transducer 152 and write transducer 154. Transducer pair 148 may comprise read transducer 156 and write transducer 158. Likewise, transducer pair 150 may comprise read transducer 160 and write transducer 162. Each individual read transducer 152, 156 and 160 may have a centerline CR lying along the direction of travel of the magnetic tape. The placement of each read transducer may be described as related to the center line through a proximate read transducer lying between the read transducer under consideration and the centerline of the magnetic head. For purposes of explanation, consider that the centerline of the magnetic head comprising the transducer pairs 146, 148 and 150 is below transducer pair 150. The spacing between read transducer 160 and read transducer 156 may comprise two components: a base spacing B (which may be the same as the spacing of tracks of the write transducers); and an offset Δ. The offset Δ may be calculated using the following equation:

$$\Delta = \eta \times 0.25 \times M \times L / (N-1)$$

where M may be the maximum expected tape expansion (mm/mm), L may be the distance between the centerlines through the write transducers of the outermost transducer pairs, N may be the number of transducer pairs in a bump, η may be +1 for read transducers biased away from the centerline C, and η may be −1 for read transducers biased toward the centerline C. Thus, the centerline 164 through read transducer 156 may be a distance B±Δ from the centerline 166 of read transducer 160. Likewise, the centerline 168 through read transducer 152 may be a distance B±Δ from the centerline through transducer 156. Thus, each read transducer biased away from the centerline has a read transducer to read transducer spacing slightly greater than the track-to-track spacing. For bumps biased toward the centerline, η may be negative, thus each read transducer biased toward the centerline of the magnetic head has a read transducer to read transducer spacing slightly less than the track-to-track spacing.

In alternative embodiments, the distance Δ may increase exponentially toward a maximum (either toward the center or away from the centerline) for each transducer pair in the array. In yet other alternative embodiments, the read transducers may remain fixed, and the write transducers may be progressively biased. Likewise, the bias or offset may result from a combination of a translation and location of the read and the write transducers.

The above discussion is meant to be illustrative of the principles and various embodiments of the present inven-

What is claimed is:

1. A method, comprising: reading tracks from a storage media with a head having a first set of read transducers positioned on the head to compensate for shrinkage of the storage media, and the head having a second set of read transducers positioned on the head to compensate for expansion of the storage media.

2. The method as defined in claim 1 wherein the storage media is a magnetic tape, and the method further comprising reading the tracks of the magnetic tape with the first set of read transducers if the magnetic tape has a smaller width than when the magnetic tape was originally written.

3. The method as defined in claim 1 wherein the storage media is a magnetic tape, and the method further comprising reading the tracks of the magnetic tape with the second set of read transducers if the magnetic tape has a larger width than when the magnetic tape was originally written.

4. A method, comprising:
reading tracks from a storage media with a head having a first set of read transducers positioned to compensate for shrinkage of the storage media, and the head having a second set of read transducers positioned to compensate for expansion of the storage media;
reading a first servo band with a first servo transducer;
reading a second servo band with a second servo transducer;
moving the head over the tracks of the storage media based on information obtained during the steps of reading a first servo band and reading a second servo band; and
utilizing one of the first and second set of read transducers that provides better signal-to-noise ratio.

5. The method as defined in claim 1 wherein the storage media is a magnetic disk.

6. A method, comprising: reading tracks from optical storage media with a head having a first set of read transducers positioned to compensate for shrinkage of the optical storage media, and the head having a second set of read transducers positioned to compensate for expansion of the optical storage media.

7. A magnetic head assembly for writing a magnetic media, the magnetic head assembly comprising:
a first bump on a surface of the magnetic head comprising a plurality of transducer pairs each having a read and write transducer, each read and write transducer in a transducer pair having a centerline through the transducer along a direction of travel of the magnetic media across the magnetic head assembly;
a second bump on the surface of the magnetic head comprising a plurality of transducer pairs each having a read and write transducer, each read and write transducer in a transducer pair having a centerline through the transducer along the direction of travel of the magnetic media across the magnetic head assembly;
wherein read transducers of the transducer pairs of the first bump are positioned such that a spacing between centerlines through the read transducers are slightly larger than a spacing between centerlines through the write transducers of the first bump; and
wherein read transducers of the transducer pairs of the second bump are positioned such that a spacing between centerlines through the read transducers are slightly smaller than a spacing between centerlines through the write transducers of the second bump.

8. The magnetic head assembly as defined in claim 7 further comprising:
a first servo transducer on a first distal end of the magnetic head assembly; and
a second servo transducer on a second distal end of the magnetic head assembly.

9. The magnetic head assembly as defined in claim 7 further comprising:
the first bump comprising at least eight transducer pairs; and
the second bump comprising at least eight transducer pairs.

10. The magnetic head assembly as defined in claim 9 further comprising each of the first and second bump comprising 16 transducer pairs.

11. The magnetic head assembly as defined in claim 7 wherein a distance between centerlines through read transducers within a bump is equal to a distance between centerlines through write transducers within the bump plus an offset determined using substantially the following equation:

$$\Delta = \eta \times 0.25 \times M \times L/(N-1)$$

where $\Delta$ is the offset, M is a maximum expected tape expansion, L is a distance between the centerlines through the outermost write transducers of the bump, N is a number of transducer pairs in the bump, $\eta$ is +1 for read transducers biased away from a centerline C, and $\eta$ is −1 for read transducers biased toward the centerline C 12. A system comprising:
a magnetic head;
a drive mechanism for selectively moving magnetic tape across the magnetic head;
a magnetic head positioning circuit coupled to the magnetic head, the magnetic head positioning circuit selectively locates the magnetic head along data bands of the magnetic tape; and
wherein the magnetic head comprises:
a first plurality of transducer pairs, and wherein read transducers of the first plurality of transducer pairs are progressively biased on the head away from a centerline of the magnetic head; and
a second plurality of transducer pairs, and wherein the read transducers of the second plurality of transducer pairs are progressively biased on the head toward the centerline of the magnetic head.

13. The system as defined in claim 12 wherein the system uses the first plurality of transducer pairs to read data from a magnetic tape whose track-to-track spacing has increased since the data was originally written.

14. The system as defined in claim 12 wherein the system uses the second plurality of transducer pairs to read data from a magnetic tape whose track-to-track spacing has decreased since the data was originally written.

15. The system as defined in claim 12 further comprising:
the first plurality of transducer pairs further comprises at least eight transducer pairs; and
the second plurality of transducer pairs further comprises at least eight transducer pairs.

16. The system as defined in claim 15 wherein the first plurality of transducer pairs comprises sixteen transducer pairs, and wherein the second plurality of transducer pairs comprises sixteen transducer pairs.

17. A system comprising:
a means for accessing data tracks of storage media as the storage media traverses the means for accessing, the means for accessing compensated for dimensional change of size of the storage media;

a means for moving storage media across the means for accessing; and a means for positioning the means for accessing along data bands of the storage media.

18. A system comprising:

a means for accessing data tracks of storage media as the storage media traverses the means for accessing, the means for accessing compensated for dimensionial change of size of the storage media, wherein the means for accessing further comprises:

a first plurality of means for reading and writing, and wherein centerlines through each means for reading of the first plurality of means for reading and writing are progressively shifted away from a centerline of the means for accessing; and     a second plurality of means for reading and writing, and wherein centerlines through each means for reading of the second plurality of means for reading and writing are progressively shifted toward the centerline of the means for accessing;

a means for moving storage media across the means for accessing; and a means for positioning the means for accessing along data bands of the storage media.

19. The system as defined in claim 17 wherein the first plurality of means for reading and writing are used to read data from a storage media whose track-to-track spacing has increased since the data was written.

20. The system as defined in claim 17 wherein the second plurality of means for reading and writing are used to read data from a storage media whose track-to-track spacing has decreased since the data was written.

\* \* \* \* \*

UNITED STATES PATENT AND TRADEMARK OFFICE
CERTIFICATE OF CORRECTION

PATENT NO. : 6,999,268 B2
APPLICATION NO. : 10/639335
DATED : February 14, 2006
INVENTOR(S) : Carl Robert Hoerger It is certified that error appears in the above-identified patent and that said Letters Patent is hereby corrected as shown below:

On the Title Pg, Item (75), under "Inventor", line 1, delete "Bois," and insert -- Boise, --, therefor.

In column 5, line 8, after "into" insert -- consideration the area --.

In column 7, line 40, in Claim 6, after "from" insert -- an --.

In column 8, line 30, in Claim 11, after "C" insert -- . --.

In column 9, line 10, in Claim 18, delete "dimensionial" and insert -- dimensional --, therefor.

Signed and Sealed this

Twenty-second Day of September, 2009

David J. Kappos
*Director of the United States Patent and Trademark Office*